April 24, 1934.　　F. STEBLER ET AL　　1,955,983
BOX DUMPING MACHINE
Filed Dec. 20, 1932　　4 Sheets-Sheet 1
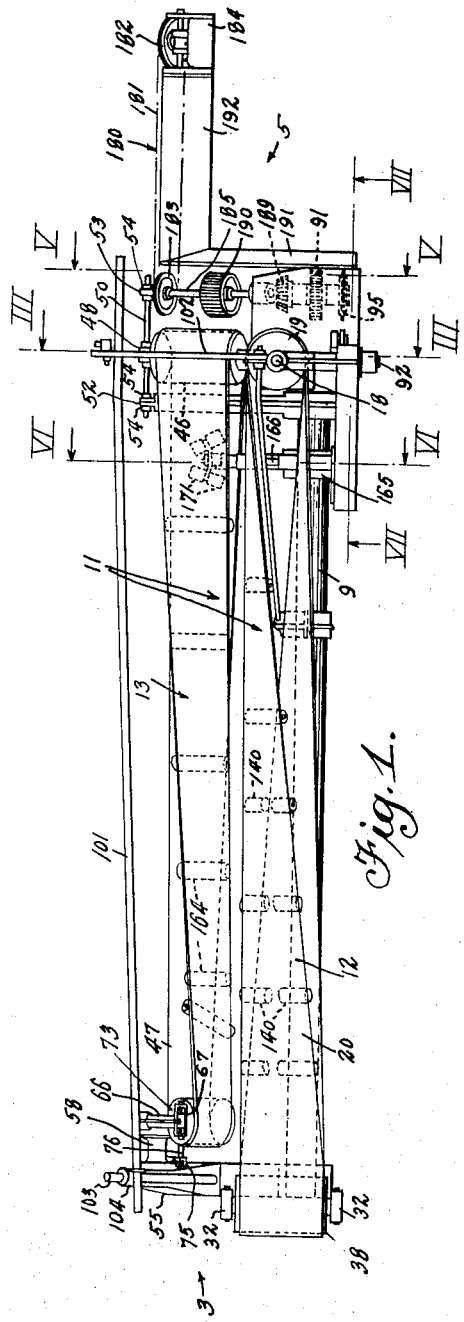
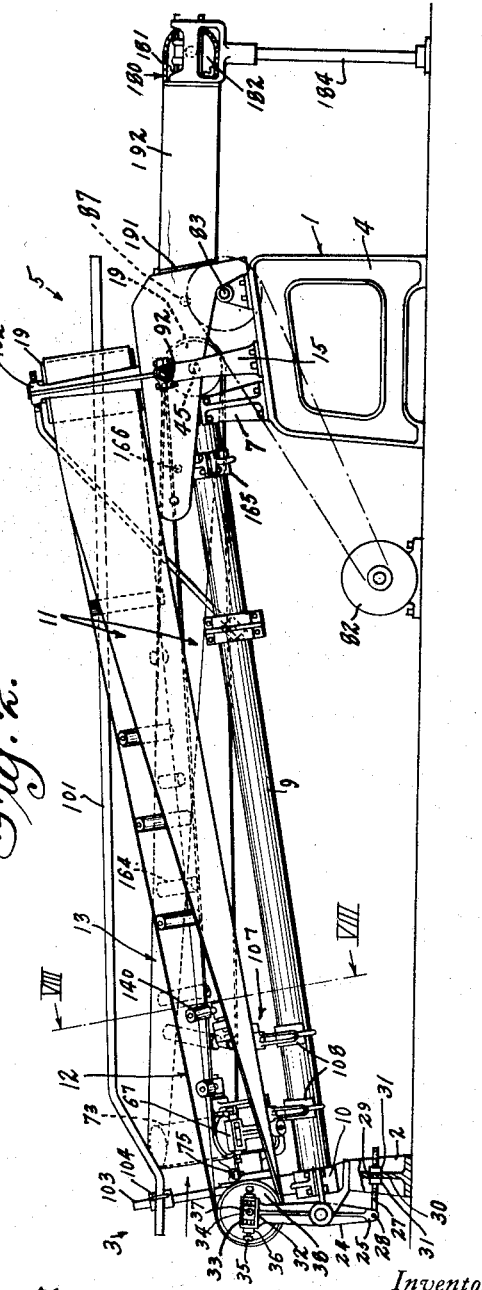
Inventors
Fred Stebler
Glenn Edwin Stilwell
By Lyon & Lyon
Attorneys April 24, 1934.   F. STEBLER ET AL   1,955,983
BOX DUMPING MACHINE
Filed Dec. 20, 1932   4 Sheets-Sheet 2

Inventors
Fred Stebler
Glenn Edwin Stilwell
By Lyon & Lyon
Attorneys

April 24, 1934.   F. STEBLER ET AL   1,955,983
BOX DUMPING MACHINE
Filed Dec. 20, 1932   4 Sheets-Sheet 3

Inventors
Fred Stebler
Glenn Edwin Stilwell
By Lyon & Lyon
Attorneys

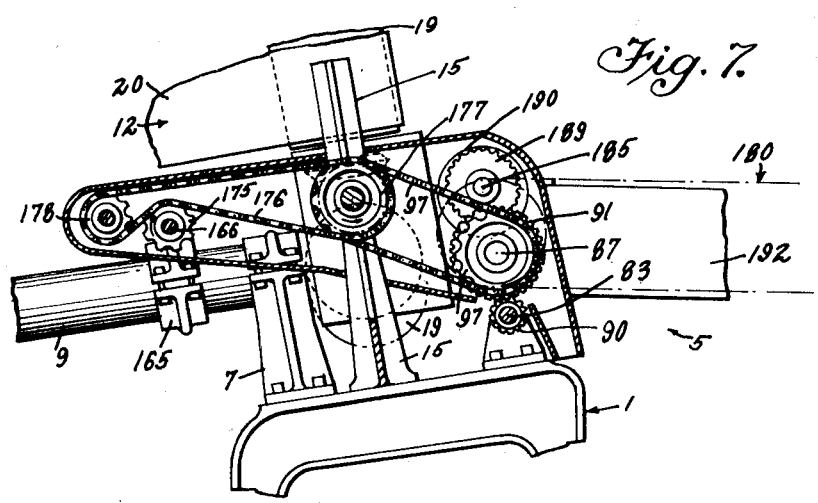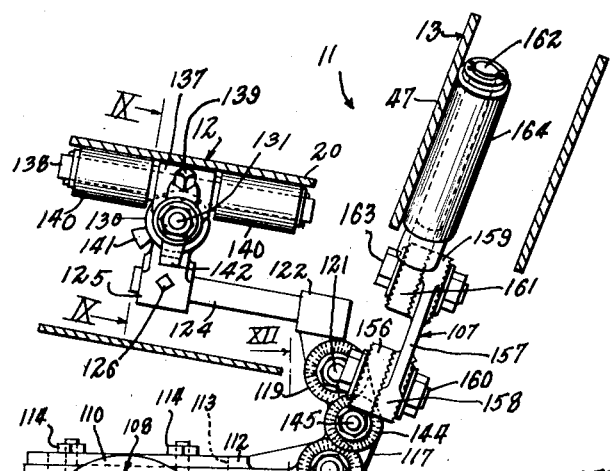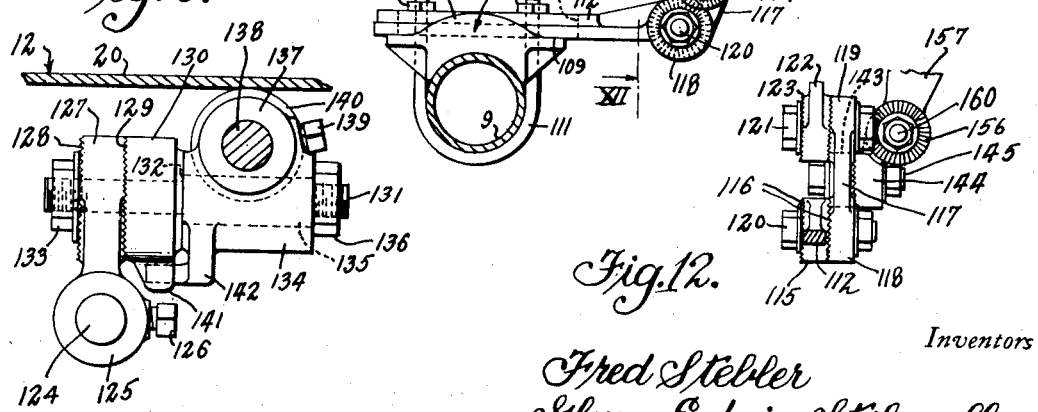

Patented Apr. 24, 1934

1,955,983

UNITED STATES PATENT OFFICE 1,955,983

BOX DUMPING MACHINE

Fred Stebler and Glenn Edwin Stilwell, Riverside, Calif., assignors to Food Machinery Corporation, San Jose, Calif., a corporation of Delaware Application December 20, 1932, Serial No. 648,048

10 Claims. (Cl. 214—1.1)

This invention relates to box dumping machines and has particular reference to a machine for receiving boxes filled with fruit and for inverting the same to dump the contents of the boxes. In handling small pieces of material, it is common practice to collect the same in trays or boxes for the purpose of transporting them from one point to another, at which later point the articles are to be sorted or handled separately, and this is particularly true in the citrus fruit industry in which lugs, boxes or trays are employed for collection of the fruit as it is picked from the trees, these trays then being transported to a central handling depot, at which point the fruit is to be sorted, graded, and various operations performed upon each piece of fruit individually.

At the central point the boxes must be dumped upon a suitable grading tray or conveyor which in turn may carry the dumped fruit to a grading table or other fruit-treating apparatus. It is laborious and tiring work lifting and dumping the heavy boxes of fruit.

It is therefore an object of this invention to provide a machine into which boxes filled with fruit may be fed, which machine will receive and automatically dump the fruit from the boxes onto a receiving tray or conveyor.

Most varieties of fruit are easily bruised or injured by jolting or rough handling. It is therefore an object of this invention to provide a machine which will operate without jarring the boxes or fruit and which will automatically tilt the boxes to gradually spill the fruit onto a suitable receiving medium so that the fruit will not be bruised or injured while being dumped.

The lug boxes are used over and over again and unless carefully handled soon fall apart or become broken and must be replaced, thus requiring a needless expense. It is a further object to provide a dumping machine which will be easy on the boxes during the travel of the boxes through the machine.

Another object is to provide a machine into which boxes filled with fruit may be fed, the machine automatically inverting the boxes to discharge the contents thereof upon a receiving tray or conveyor and the boxes again righted and passed out of the machine.

Another object is to provide a machine which will dump boxes of different shapes and sizes without adjustment.

Another object is to provide a machine for transporting a box in a longitudinal direction while at the same time inverting the box for dumping the contents thereof.

Another object is to provide a machine with endless belt conveyors adapted to receive boxes in series and move the same in a longitudinal direction and to invert and thus spill the contents from the boxes during such movement.

A further object is to provide a dumping machine with a box-jolting means for insuring that all of the fruit will be spilled from the box.

A still further object is to provide a box-tilting and dumping unit including a pair of endless belt conveyors arranged in angular relation to each other and having a helical pitch of approximately 90° from end to end, whereby at the receiving end the first conveyor may be substantially horizontal to receive the boxes while the second conveyor may be nearly vertical and whereby due to the helical pitch of the conveyors the conveyor belts will gradually tilt until at the discharge end the first conveyor may be practically vertical while the second conveyor will have tilted slightly beyond the horizontal to insure that all of the fruit will roll out of the box riding upon this second conveyor.

A further object is to provide a box-turning and transfer unit including a pair of conveyors arranged whereby the conveyors may be maintained approximately at right angles to each other and having a helical pitch of approximately a quarter turn, and arranged so that at the receiving end one conveyor may be substantially horizontal to receive the boxes while the second conveyor may be nearly vertical and whereby due to the helical pitch of the conveyors the box received upon the first conveyor will be turned and transferred to the second conveyor.

A further object is to provide the dumping machine with means for tilting the dumped box back to its upright position.

A further object is to provide the roller supporting means for the conveyor belts of a dumping machine with a limited amount of motion to facilitate the tilting of the boxes.

A further object is to provide a dumping machine which will be smooth and effective in operation and which will be compact and simple in construction.

Other objects and advantages of the invention will become apparent as the nature of the same is more fully understood from the following description and accompanying drawings, wherein is set forth what is now considered to be a preferred embodiment. It should be understood, however, that this particular embodiment of the invention is chosen principally for the purpose of exemplification and that variations there-from in details of construction or arrangement of parts may accordingly be effected and yet remain within the spirit and scope of the invention as the same is set forth in the appended claims.

In the drawings:

Fig. 1 illustrates a plan view of the invention.

Fig. 2 illustrates a side view of Fig. 1.

Fig. 7 illustrates an enlarged fragmental view taken substantially in the plane of line 7—7 of Fig. 1.

Fig. 8 illustrates an enlarged sectional view taken substantially in the plane of line 8—8 of Fig. 2.

Fig. 9 illustrates an enlarged sectional view taken substantially in the plane of line 9—9 of Fig. 8.

Fig. 12 illustrates a sectional view taken substantially in the plane of line 12—12 of Fig. 8.

Figure 5:
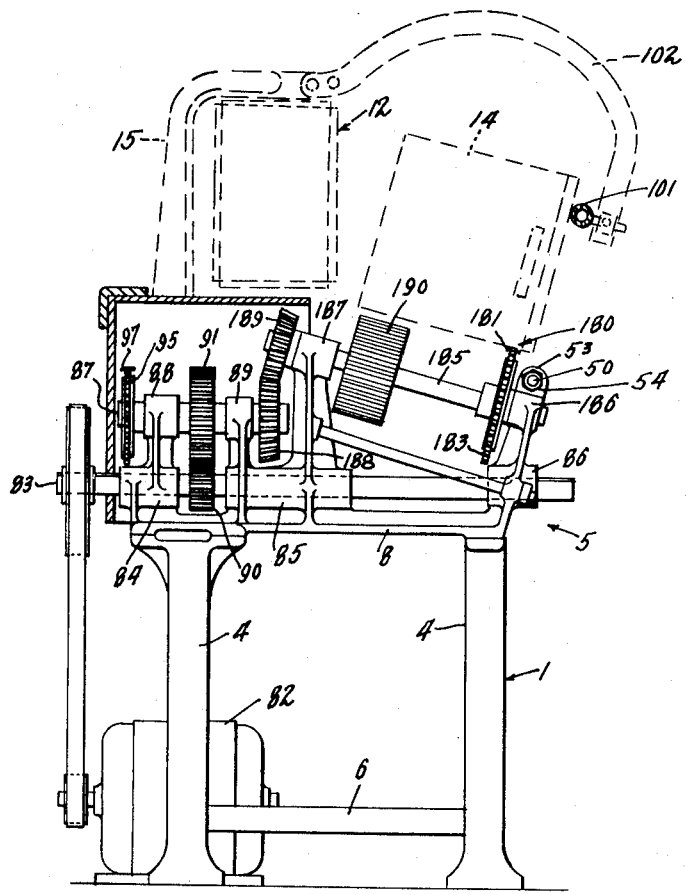
Fig. 5 illustrates an enlarged sectional view taken substantially in the plane of line 5—5 of Fig. 1.
Figure 6:
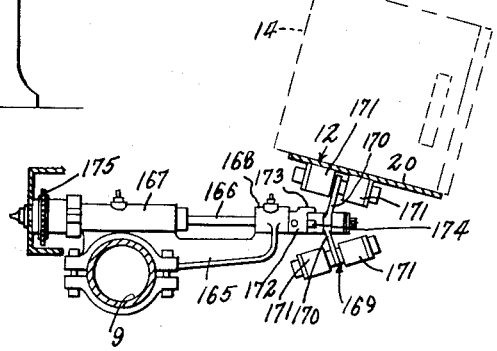
Fig. 6 illustrates an enlarged sectional view taken substantially in the plane of line 6—6 of Fig. 1.

In the preferred embodiment of the invention as illustrated in the drawings, a suitable frame 1 may be provided which may include the short legs 2 located at the receiving end 3 of the machine and a pair of tall legs 4 located at the discharge end 5 of the machine. The tall legs 4 may be interconnected by means of a suitable tie bar 6 and by means of the tube bracket 7 and the bearing bracket 8 (Fig. 5). The short legs 2 and the tall legs 4 may be interconnected by means of the tube 9 forming the backbone of the machine. The tube 9 may be suitably mounted to the short legs 2 by means of tube bracket 10 and to the tall legs 4 by means of the tube bracket 7.

Figure 4:
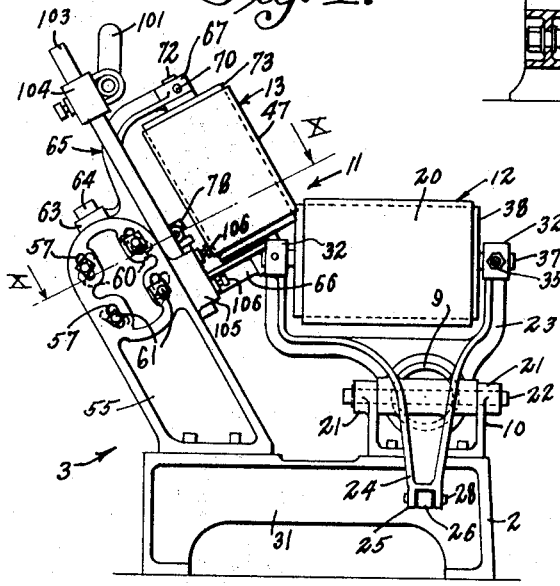
Fig. 4 illustrates an enlarged end view of Fig. 1.

A pair of endless belt conveyors 11 may be mounted upon the frame in side-by-side relation, that is, the longitudinal axis of each conveyor may lie in parallel planes and also the conveyors may be angularly positioned with respect to each other, as will be noted from Fig. 4, which figure illustrates the receiving end 3 of the machine. In this figure the receiving conveyor 12 is shown in a substantially horizontal position while the discharge or dumping conveyor 13 is shown as operating in nearly a vertical plane; in other words, the conveyors 11 are maintained in an angular relationship to each other.

Figure 3:
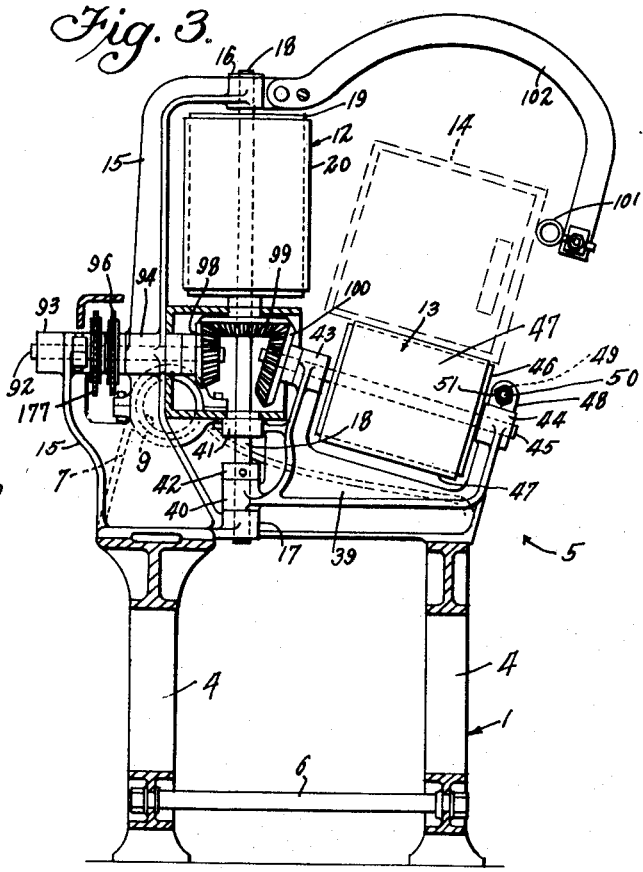
Fig. 3 illustrates an enlarged sectional view taken substantially in the plane of line 3—3 of Fig. 1.

The conveyors 11 may also be given a helical pitch throughout their length so that the receiving conveyor 12 may present a horizontal receiving surface to the on-coming boxes and at the discharge end 5 of the machine operate in a substantially vertical plane (note Fig. 3). While the discharge or dumping conveyor 13 may operate in a nearly vertical plane at the receiving end of the machine (note Fig. 4), it may, due to its helical pitch, operate in a plane slightly below a horizontal plane, at the discharge end of the machine, as is clearly illustrated in Fig. 3. As will be observed, the helical pitch amounts to approximately a quarter turn for the length of the conveyor, whereby a filled box may be received in a horizontal plane by the receiving conveyor 12 and gradually tilted until the box is transferred onto the discharge conveyor 13 which continues the gradual tilting of the box until the box 14, illustrated in broken lines in Fig. 3, has been turned over upon its side and to such an angle as to insure that all of the fruit or other contents of the box will have spilled out.

Any suitable means may be provided for mounting the conveyors in angular relationship to each other and with the desired helical pitch. As illustrated in the drawings, the means for mounting the receiving conveyor 12 may include a pulley bracket 15 mounted upon the tall legs 4 between the tube bracket 7 and the bearing bracket 8, and may be provided with bearing bosses 16 and 17, in which bearing bosses the vertical shaft 18 may be journaled.

A pulley 19 may be suitably mounted upon the upper end of the vertical shaft 18 around which pulley the discharge end of the endless belt 20 of the receiving conveyor may be played. The roller bracket 15, in which shaft 18 is mounted, may be termed the fixed bracket as this end of the conveyor is fixed and not adjustable in relation to the machine frame.

The means for supporting the receiving end of the endless conveyor belt 20 should be made adjustable whereby the belt may be tensioned to any desired degree of tautness. For this purpose the tube bracket 10 may be provided with a pair of spaced bearings 21 for the support of shaft 22 upon which shaft may be journaled the pulley yoke 23. The pulley yoke 23 may be provided with a depending arm 24 which may be bifurcated at its end as at 25. Between the bifurcated portion 25 a head 26 of the adjusting screw 27 may be operatively fastened by means of pin 28, while the adjusting screw may be passed through an appropriate hole 29 in the web 30 of the short leg 2. A suitable nut 31 may be threaded upon the adjusting screw 27 and tightened against each side of the web 30 to lock the roller yoke in an adjusted position. It will be appreciated that by turning the nuts 31, the pulley yoke 23 may be rotated upon shaft 22 to tighten or loosen the conveyor belt 20 as desired and by tightening the nuts 31 the pulley yoke may be securely locked in the adjusted position.

The upper ends 32 of yoke 23 may be provided with rectangular openings 33 for receiving the bearing blocks 34, which bearing blocks may be slid back or forth in the rectangular openings 33 by means of the adjusting screws 35 for aligning the pulleys or for further adjusting the tension of the conveyor belt 20. The adjusting screws 35 may be locked in the adjusted position by means of the lock nuts 36. A horizontal shaft 37 may be carried by bearings 34 upon which shaft a pulley 38 may be journaled, around which pulley the receiving end of the endless conveyor belt 20 may be played.

Thus it may be observed that the receiving end of the endless conveyor belt 20 is played around pulley 38 having a horizontal axis of rotation while the discharge end of the belt 20 is played around the pulley 19 having a vertical axis of rotation, thereby giving the conveyor belt 20 a helical pitch of a quarter of a revolution or 90°, for its length.

The discharge or dumping conveyor 13 may be operatively and adjustably mounted upon the machine frame by any suitable means. As illustrated in the drawings, the mounting and adjusting means for the discharge conveyor 13 may include at the discharge end of the conveyor a swinging yoke bracket 39 (Fig. 3) having a pair of spaced bearings 40 and 41 adapted to be journaled upon the vertical shaft 18 carried by the pulley bracket 15.

In order to retain the swinging yoke bracket 39 at the desired position on shaft 18, the bearing 40 thereof may be positioned to bear upon the top surface of the bearing 17 of bracket 15, while a collar 42 may be suitably pinned to shaft 18 so as to bear against the upper surface of the swinging yoke bracket bearing 40 to take the thrust of shaft 18 in a downwardly direction. The swinging yoke bracket 39 may be provided with spaced bearings 43 and 44 through which the shaft 45 may be journaled, upon which shaft the pulley 46 may be suitably fastened.

The discharge end of the endless conveyor belt 47 may be played around pulley 46. In the preferred embodiment of the invention as illustrated in Fig. 3 of the drawings, the swinging yoke bracket 39 may be provided with bearings 43 and 44 positioned to support shaft 45 and pulley 46 at an angle of more than 90° from the vertical position of the shaft 18 and pulley 19 of the receiving conveyor whereby boxes such as 14 will be tilted a sufficient amount to insure that all of the fruit will be dumped from the box during its travel through the machine. However, if desired, swinging yoke bracket 39 may be arranged to support shaft 45 and pulley 46 in a horizontal plane. The swinging yoke bracket 39 may swing about shaft 18 as a center of rotation, which is of advantage as thereby the angle of the pulley 46 may be nicely adjusted to insure that the conveyor belt 47 will play squarely around the pulley. Means may be provided for adjusting and locking bracket 39 in the desired position, which means may include providing the yoke bearing 44 with a boss 48 having an appropriate hole 49 through which the threaded rod 50 may loosely play. Suitable lock nuts 51 may be screwed upon the rod for engaging each side of boss 48, thereby securely locking the yoke 39 in the adjusted position, or by means of the lock nuts 51 the position of yoke 39 may be accurately adjusted and then locked at the adjusted position. The threaded rod must be anchored to any portion of the machine frame as, for example, the tube bracket 7 and the bearing bracket 8 (Figs. 1, 3 and 5) may be provided with arms 52 and 53 through which the threaded rod 50 may extend and be locked thereto by suitable lock nuts 54. By this arrangement, the threaded rod 50 may also act as a brace or tie rod for the members 7 and 8.

Figure 10:
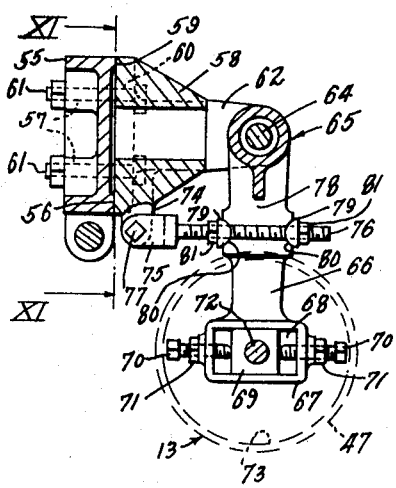
Fig. 10 illustrates an enlarged sectional view taken substantially in the plane of line 10—10 of Fig. 4.
Figure 11:
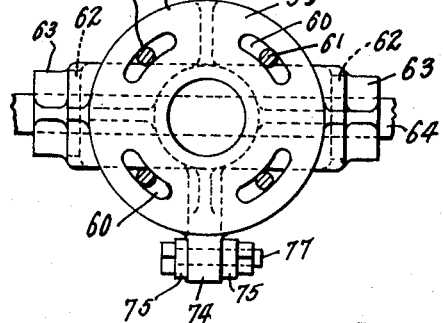
Fig. 11 illustrates an enlarged sectional view taken substantially in the plane of line 11—11 of Fig. 10.

The front end of the discharge or dumping conveyor belt 47 may be adjustably mounted upon the front end 3 of the machine frame by means of the angular pedestal 55 which may be suitably mounted upon the short legs 2 (Figs. 4, 10 and 11). The upper end of pedestal 55 may be provided with a clamping face 56 through which may extend four bolt slots 57 having their major axis parallel to the axis of the pedestal. A swivel yoke 58 may be provided with a clamping face 59 adapted for engagement with the pedestal clamping face 56 and may be provided with four equally spaced arcuate bolt slots 60. The swivel yoke 58 may be clamped to the pedestal 55 by means of suitable bolts 61 which pass through the pedestal slots 57 and the arcuate slots 60 of the swivel, whereby upon loosening the bolts, swivel 58 may be shifted to the full extent of the pedestal slots 57 and at the same time swiveled to the full extent of the arcuate swivel yoke slots 60, thereby obtaining a wide range of adjustability. When the swivel yoke has been shifted to the desired position, the bolts 61 may be tightened to securely clamp the swivel to the pedestal. The outwardly extending arms 62 of the swivel yoke 58 may each be provided with a bearing 63 for the support of the shaft 64.

A pulley yoke 65 may be journaled upon shaft 64 between bearings 63 and each arm 66 of yoke 65 may be provided with a rectangular boss 67 (Fig. 10) having a rectangular opening 68 for slidably receiving a bearing block 69 adjustably positioned in opening 68 by means of set screws 70 and lock nuts 71. A pulley shaft 72 may be journaled in bearings 69 and a conveyor belt pulley 73 may be suitably carried thereby, around which pulley the forward end of the discharge or dumping conveyor belt 47 may be played. Means may be provided for adjusting and locking in adjusted position the pulley yoke and thereby adjusting the tension of the conveyor belt 47, which means may include providing the swivel yoke 58 with a boss 74 to which the head 75 of the tensioning screw 76 may be pivotally attached by means of the bolt 77. The tensioning screw 76 may be passed through an appropriate slot 78 formed in yoke 65 and by means of the semi-circular washers 79, which engage corresponding circular notches 80 of the yoke, and nuts 81, the pulley yoke 65 may be swung to tension the conveyor belt 47 to a desired degree and then locked by means of the nuts 81. The conveyor belt pulley 73 may be adjusted to a wide range of positions and angles, due to the type of mounting just described and also may be swung to tension the conveyor belt without materially disturbing the adjusted position of the pulley.

Any suitable means may be provided for simultaneously driving the conveyors 11 as, for example, an electric motor 82 may drive a countershaft 83 in any conventional way. The countershaft 83 may be journaled in the bearing bracket 8 by means of bearings 84, 85 and 86. A second shaft 87 may be journaled in bearings 88 and 89 parallel and directly above the countershaft 83. Bearings 88 and 89 may be formed as part of bracket 8. The second shaft 87 may be driven from the countershaft by means of pinion 90 and gear 91. A third shaft 92 journaled in pulley bracket 15 by means of bearings 93 and 94 may be driven from the second shaft 87 by means of sprocket 95 and 96 and chain 97. The inner end of the third shaft 92 may be provided with a bevel pinion 98 positioned to mesh with and drive the bevel gear 99 suitably carried by the pulley shaft 18 whereby the pulley 19 is driven to operate the receiving conveyor 12. The swinging bracket pulley shaft 45 may be extended to carry a bevel gear 100 positioned to mesh with the bevel gear 99, whereby the discharge conveyor pulley 46 may be driven to operate the discharge or dumping conveyor 13. The bevel gears 99 and 100 may be of the same size so that both conveyors may be driven at the same rate of speed.

When it is desired to use the machine for dumping the contents from boxes, it is desirable to incline the discharge end of the dumping conveyor 13 from the horizontal, as illustrated in Fig. 3, in order to incline the boxes passing through the machine sufficiently to insure that all of the contents of the boxes will be spilled out. Due to the inclination of the dumping conveyor 13, the boxes might have the tendency to slide off the conveyor and therefore means may be provided for maintaining the boxes upon the conveyor, which means may include a guide rail 101 supported from the pulley bracket 15 by means of the arcuate arm 102 and from the pedestal 55 by means of the bar 103 and clamp means 104. The bar 103 may be adjustably mounted upon the pedestal by extending bar 103 through a suitable boss 105 having clamping screws 106, while the guide rail 101 may be further adjusted with relation to bar 103 by shifting the clamp means 104.

The contents discharged from the boxes passing through the machine may be deposited directly upon a suitable sorting table or upon a conveyor, neither of which means has been illustrated in the drawings, as they may be of the usual form now in common use and which form no part of this invention.

To assist the conveyors 11 in supporting the weight of and turning the loaded boxes, the conveyors may be provided with a plurality of supporting means such as the roller assemblies 107. As each of the roller assemblies may be alike excepting as to its adjustment to different angles and positions, only one of these assemblies will be described.

Each roller assembly 107 may include, as illustrated in Figs. 8 and 9, a saddle 108 adapted to fit the tube 9, and provided with a clamping surface 109 sided by walls 110 and having two bolt holes for receiving the U bolt 111. A bracket 112 may be mounted upon the saddle clamping surface 109 and may be provided with a slot 113 through which the U bolt may extend and by means of nuts 114 the U bolt may securely clamp the saddle to the tube and at the same time securely clamp the bracket 112 to the saddle. By loosening the nuts 114, the saddle 108 together with bracket 112 may be swung to any desired angular position with relation to the tube and may also be slid along the tube to desired location. Due to slot 113, the bracket may be shifted with respect to the saddle to the extent of the slot.

The free end of bracket 112 may be provided with a boss 115 having each face thereof serrated, as indicated at 116. A link 117 may be provided with similar bosses 118 and 119 of the same size as the bracket boss 115, and like the bracket boss 115 the bosses 118 and 119 may have one face serrated. The link 117 may be clamped to the bracket boss 115 by means of a suitable bolt 120, whereby the serrated faces of bosses 115 and 118 may be clamped together at any desired angular relation and the serrations act to lock the parts against accidental rotation. To the boss 119 of link 117 may be clamped, by means of bolt 121, a roller bracket 122 having a boss 123 serrated upon each face so that it may be used for either a right or left hand application. Bracket 122 may be provided with a bar 124 upon the outer end of which the receiving conveyor supporting rollers may be adjustably mounted, by means of bracket 125 and set screw 126.

The bracket 125 may be provided with a boss 127 having serrated faces 128 and 129, to one of which faces, 129 in this instance, the serrated face of the stop bracket 130 may be securely clamped by the bolt 131, having a shoulder as at 132 for engaging the rear face of the stop bracket and held in clamping relation by means of nut 133. A roller shaft support 134 may be journaled upon the main portion 135 of bolt 131 and retained in operative position by the nut 136.

The roller shaft support 134 may be provided with a transverse boss 137 through which the roller shaft 138 may be fastened by the set screw 139. A conveyor belt roller 140 may be journaled upon shaft 138 upon each side of support 134. By this arrangement, the rollers 140 are free to rock about bolt 131 as a center so as to more efficiently assist in the turning of the loaded boxes upon their sides. However, it may be desirable to limit this rocking motion of the rollers 140 and for that purpose the stop bracket 130 may be provided with a stop lug 141 and the support 134 with a finger 142 adapted to engage the stop lug to arrest further rocking of the rollers at any desired point, which may be adjusted by rotating the stop bracket 130 with relation to the boss 127.

The means for supporting the dumping conveyor belt 47 may be fastened to the side of link 117 opposite to the side having the serrated bosses 118 and 119 and substantially midway between these bosses. The link 117 for this purpose may be provided with a serrated boss 143 to which an angle bracket 144 having a like serrated face may be securely fastened by means of bolt 145. The bracket 144 may be provided with an angle boss 156 having each face thereof serrated so as to be available for right or left hand use.

The serrated boss 158 of link 157 may be securely fastened to the angle boss 156 by means of bolt 160 while to the serrated boss 159 of link 157 the serrated boss 161 of the roller shaft 162 may be clamped by means of bolt 163. The conveyor belt roller 164 for supporting the conveyor belt 47 may be journaled upon the roller shaft 162.

It will be appreciated that due to the many adjusting means of the roller assemblies 107 acting in different planes that the rollers 140 and 164 may be swung to most any desired position for supporting its respective conveyor belt. Thus each roller assembly positioned along the helical pitch of the conveyors may be easily adjusted to place the rollers at the most effective supporting position for their respective conveyor belts.

Means may be provided for jolting the boxes during their passage through the machine to assist the contents thereof in leaving the boxes before the boxes leave the machine, which means may include a jolter bracket 165 suitably fastened to tube 9 and supporting a jolter shaft 166 in bearings 167 and 168. A jolter 169 may be journaled upon the end of shaft 166 and may be provided with opposed arms 170, each carrying a pair of rollers 171. A driving sleeve 172 may be suitably keyed to shaft 166 and may also be provided with a projecting driving dog 173, which dog may project over the hub of the jolter 169 to engage a driving lug 174 formed on the jolter hub.

The jolter shaft 166 may be provided with a driven sprocket 175 adapted to be driven by means of chain 176 which passes over the jolter driving sprocket 177 keyed upon the third shaft 92 (Figs. 3 and 7). If desired the jolter chain 176 may be played around an idler sprocket 178, which sprocket may be suitably carried by the jolter frame 165 so that the jolter chain may be played over the top of sprocket 175, thus causing the jolter to rotate in direction corresponding to the travel of the boxes through the machine.

By journaling the jolter upon shaft 166 and driving the same by the dog 173 and lug 174, the jolter will be rotated due to the driving dog until rollers 171 carried by one arm 170 engage and slightly lift the box, but upon passing over the center, the weight of the box will cause the jolter to jump ahead, causing the opposite rollers 171 to sharply jolt the box to discharge any fruit which might otherwise have a tendency to stick in the box.

After the boxes have been dumped it may sometimes be desirable to return the empty boxes to their upright position. The means for returning the dumped boxes to their upright position may include providing a narrow conveyor 180 positioned at the end of and in alignment with the discharge conveyor 13.

From Fig. 1 it may be observed that the narrow conveyor 180 may be positioned in alignment with the outer edge of the discharge conveyor 13, whereby the outer edge of the discharged box may be received and carried forwardly by this narrow conveyor and as there are no means provided for supporting the inner edge of the discharged box, the box will turn right side up, that is, with the open side up. A chute or conveyor may be provided to carry away the righted boxes as they leave the machine and as any form of chute or conveyor may be used for this purpose, none has been shown.

The narrow conveyor 180 may include an endless chain 181 played around sprockets 182 and 183. The sprocket 182 may be adjustably mounted upon standard 184, while the sprocket 183 may be suitably fastened upon the drive shaft 185 carried in the bearing bracket 8 by bearings 186 and 187. The drive shaft 185 may be driven from the second shaft 87 by means of angle gears 188 and 189 (note Fig. 5). To ease the box into its upright position, shaft 185 may be provided with a wide faced turning wheel 190, down the periphery of which the inner edge of the box may travel during the turning operation of the box to its upright position. Suitable guide means, such as slides 191 and 192 to further assist the box in turning to its upright position, may be provided. A chute or conveyor may be positioned directly under the narrow turning conveyor 180 to receive and carry away the turned boxes.

The operation of the machine may be briefly stated as follows:

The machine is first set into operation, conveyor belts tensioned to the desired degree, and then the filled boxes may be fed upon the receiving conveyor 12 by hand or from another conveyor. Due to the helical pitch of the conveyors, the box during its travel through the machine is gradually and gently turned over upon its side to dump or spill the contents thereof upon a sorting table or other conveyor, not shown. During the turning of the box upon its side, it is transferred to the dumping and discharge conveyor 13 and before leaving the dumping conveyor 13 is tilted so that the open side is substantially below a horizontal plane and when so inclined, passes over the jolter 169, whereby any fruit which may tend to cling in the box is jolted free and may roll out of the box. Also after the box has been tilted, the upper edge thereof may slide along the guide rail 101, which will prevent the box from sliding from the dumping conveyor 13. As the dumped boxes leave the dumping conveyor, the outer edges thereof will ride along the narrow turning conveyor 180 while the inner edges will travel down the broad turning wheel 190 until the boxes are again righted, whereupon they may engage a suitable slide or conveyor which will conduct the boxes away.

Having fully described a preferred form of the invention, it is to be understood that it is not to be limited to the details herein set forth but the invention is of the full scope of the appended claims.

We claim:

1. A box-dumping machine including the combination of a frame, a pair of angularly related side-by-side endless belt conveyors operatively mounted therein, said conveyors having a helical pitch of substantially a quarter turn, a jolter shaft operatively journaled in the frame and having one end extending beneath the box supporting run of the dumping conveyor, a jolter having a pair of arms adapted to alternately engage said box supporting run of the dumping conveyor, a loose driving connection between said shaft and jolter operative for rotating the jolter until one arm engages and lifts the adjacent run of the conveyor and box supported thereby until the jolter arm passes beyond its center whereupon due to the weight of the box and conveyor run the jolter will be caused to jump ahead of the rotation of said shaft until the second arm thereof will strike and sharply jolt the conveyor run and the box carried thereby, a narrow turning conveyor arranged in alignment with the outer edge of the box supporting run of the dumping conveyor for returning the dumped boxes to their upright position, and a driving means for the dumping conveyors, jolter and turning conveyor.

2. A box-dumping machine including a helical conveyor box-dumping means, a jolter shaft, a jolter head operatively journaled upon said shaft and having a plurality of arms arranged to engage the undersurface of the box supporting run of the dumping conveyor, a loose driving connection between said shaft and jolter head, a narrow turning conveyor arranged to engage the outer edge of the boxes passing through the machine for turning the dumped boxes to the upright position, and driving means for the helical conveyor, jolter and turning conveyor.

3. A box-dumping machine including a helical conveyor box-dumping means, a jolter shaft, a jolter head operatively journaled upon said shaft and having a plurality of arms arranged to engage the underside of the box supporting run of the dumping conveyor, a loose driving connection between said shaft and jolter head, a relatively narrow turning conveyor arranged to engage the outer edges of the boxes passing through the machine for righting same, a turning wheel arranged to engage the inner edges of the boxes passing through the machine, and driving means for the helical conveyor jolter, turning conveyor and turning wheel.

4. A jolter for a twisted belt dumping machine including a jolter shaft, a jolter head journaled thereon and in position to engage the undersurface of the box supporting run of the discharge conveyor, a loose driving connection between said shaft and jolter head, and means for driving said jolter shaft.

5. A jolter for a twisted belt dumping machine including a jolter shaft, a jolter head journaled thereon and having a plurality of arms arranged to engage the undersurface of the box supporting run of the dumping conveyor, a loose driving connection between said shaft and jolter head, and means for driving said jolter shaft.

6. A jolter for a twisted belt dumping machine including a jolter shaft, a jolter head journaled thereon and having a plurality of arms arranged to engage the undersurface of the box supporting run of the dumping conveyor, anti-friction roller means carried by each of said jolter arms, a loose driving connection between said shaft and jolter head, and means for driving said jolter shaft.

7. In a box-dumping machine, a helical conveyor box-dumping means, a relatively narrow turning conveyor arranged in alignment with the outer edge of the box supporting run of the helical conveyor for turning the dumped boxes to the upright position, and driving means for the dumping and turning means.

8. In a box-dumping machine, a helical conveyor box-dumping means, a narrow turning conveyor arranged in alignment with the outer edge of the box supporting run of the helical conveyor adjacent the discharge end thereof, a turning wheel located adjacent the discharge end of said box supporting run of the conveyor adjacent the inner edge thereof, and driving means for said helical conveyor, turning conveyor and turning wheel.

9. In a box-dumping machine, a narrow turning conveyor arranged to receive the front edge of the boxes passing through the machine, a turning wheel arranged to receive the rear edge of the boxes passing through the machine, and means for operating the turning conveyor and wheel.

10. In a box-dumping machine, a narrow turning conveyor arranged to receive the front edge of the boxes passing through the machine, a corrugated turning wheel arranged to receive the rear edge of the boxes passing through the machine, and means for operating the turning conveyor and wheel.

FRED STEBLER.
GLENN EDWIN STILWELL.